(12) United States Patent
Huang

(10) Patent No.: US 10,223,601 B1
(45) Date of Patent: Mar. 5, 2019

(54) SYNTHETIC TRAFFIC OBJECT GENERATOR

(71) Applicant: DENSO International America, Inc., Southfield, MI (US)

(72) Inventor: Minglei Huang, Farmington, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/782,061

(22) Filed: Oct. 12, 2017

(51) Int. Cl.
*G06K 9/00* (2006.01)
*G06K 9/62* (2006.01)

(52) U.S. Cl.
CPC ..... *G06K 9/00818* (2013.01); *G06K 9/00798* (2013.01); *G06K 9/00825* (2013.01); *G06K 9/6267* (2013.01); *G06T 2207/20081* (2013.01); *G06T 2207/30256* (2013.01)

(58) Field of Classification Search
None
See application file for complete search history.

(56) References Cited

U.S. PATENT DOCUMENTS

| | | | |
|---|---|---|---|
| 3,193,588 | A | 7/1965 | Schmerling |
| 5,541,590 | A | 7/1996 | Nishio |
| 6,801,638 | B1 | 10/2004 | Janssen et al. |
| 7,020,804 | B2 | 3/2006 | Burdick et al. |
| 8,195,394 | B1 | 6/2012 | Zhu et al. |
| 9,248,834 | B1 | 2/2016 | Ferguson et al. |
| 9,349,285 | B1 | 5/2016 | Fowe |
| 9,767,371 | B2 * | 9/2017 | Ai .............................. G06K 9/66 |
| 9,904,859 | B2 * | 2/2018 | Grauer ................... G01S 17/107 |
| 2006/0050953 | A1 | 3/2006 | Farmer et al. |
| 2007/0239314 | A1 | 10/2007 | Kuvich |
| 2007/0239632 | A1 | 10/2007 | Burges et al. |

(Continued)

FOREIGN PATENT DOCUMENTS

| | | |
|---|---|---|
| JP | 6270076 | 9/1994 |
| JP | 8166618 | 6/1996 |

(Continued)

OTHER PUBLICATIONS

Youtube GTC 2016—Achieving Superhuman Results, https://www.youtube.com/watch?v=Eex-ZMsVOhU <https://protect-us.mimecast.com/s/27ImBotAK4Zf3> (relevant portion starting at 6:50), published Apr. 6, 2016.

(Continued)

*Primary Examiner* — Soo Jin Park
(74) *Attorney, Agent, or Firm* — Harness, Dickey & Pierce, P.L.C.

(57) ABSTRACT

A method for generating images of traffic objects using deep learning is disclosed. The method includes obtaining image data from an image. The method includes assigning a set of default parameters to the image data, and the set of default parameters include values associated with at least one of a weather condition of the image and a defect condition of an object of the image. The method includes generating a set of predicted parameters based on the image data. The method includes determining an error for each parameter of the set of predicted parameters, and the error is based on a value of the parameter of the set of predicted parameters and a value of a corresponding default parameter of the set of default parameters. The method includes adjusting a weight of a corresponding connection of the deep learning module.

16 Claims, 4 Drawing Sheets

(56) References Cited

U.S. PATENT DOCUMENTS

| | | |
|---|---|---|
| 2007/0283188 A1 | 12/2007 | Balzer et al. |
| 2009/0169055 A1 | 7/2009 | Ishikawa |
| 2010/0040285 A1 | 2/2010 | Csurka et al. |
| 2011/0044543 A1 | 2/2011 | Nakamura et al. |
| 2012/0168240 A1 | 7/2012 | Wilson et al. |
| 2012/0170805 A1 | 7/2012 | Brown et al. |
| 2013/0079990 A1 | 3/2013 | Fritsch et al. |
| 2013/0080359 A1 | 3/2013 | Will et al. |
| 2013/0129151 A1 | 5/2013 | Rodriguez Serrano et al. |
| 2014/0270350 A1 | 9/2014 | Rodriguez-Serrano et al. |
| 2015/0100530 A1 | 4/2015 | Mnih et al. |
| 2015/0125041 A1 | 5/2015 | Burry et al. |
| 2017/0314954 A1* | 11/2017 | Golding ............. G01C 21/3644 |
| 2018/0039867 A1* | 2/2018 | Cheng ................. G06K 9/00536 |
| 2018/0045519 A1* | 2/2018 | Ghadiok ................ G01C 21/28 |

FOREIGN PATENT DOCUMENTS

| | | |
|---|---|---|
| JP | 2004128997 A | 4/2004 |
| JP | 2008141704 A | 6/2008 |
| JP | 2012049781 A | 3/2012 |
| WO | WO-2015134311 A1 | 9/2015 |

OTHER PUBLICATIONS

Youtube DRAW_A Recurrent Neural Network, https://www.youtube.com/watch?v=Zt-7MI9eKEo <https://protect-us.mimecast.com/s/6RQeB4uVD5ocl>, published Sep. 17, 2015.

DRAW: A Recurrent Neural Network for Image Generation, K. Gregor, et al., Proceedings of the 32nd International Conference on Machine Learning, Lille, France, 2015. JMLR: W&CP vol. 37.

* cited by examiner

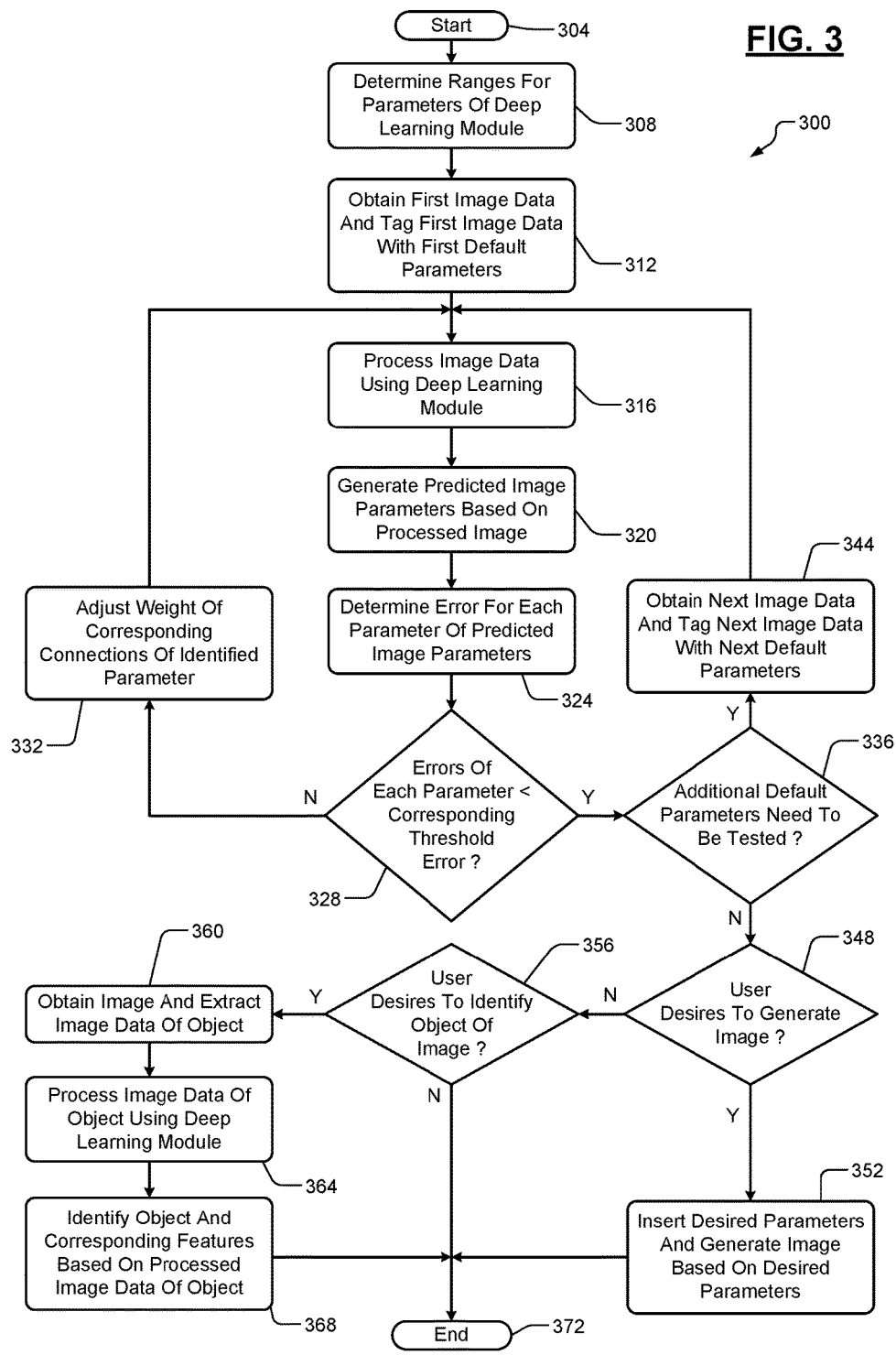

SYNTHETIC TRAFFIC OBJECT GENERATOR

FIELD

The present disclosure relates to a system and method for generating images of traffic objects using deep learning.

BACKGROUND

This section provides background information related to the present disclosure which is not necessarily prior art.

In the realm of advanced driving assistance systems and autonomous vehicles, object detection and identification is vital. In order to perform object detection and identification, standard machine learning algorithms have been implemented. However, the performance and/or efficiency of standard machine learning algorithms may plateau and not increase significantly as more data is inputted into the standard machine learning algorithm. Furthermore, standard machine learning algorithms may have various features that need to be identified and accounted for when developing the standard machine learning algorithms, which makes standard machine learning algorithms time-consuming and inefficient.

SUMMARY

This section provides a general summary of the disclosure, and is not a comprehensive disclosure of its full scope or all of its features.

The present teachings include systems and methods for generating images of traffic objects using deep learning. The method includes obtaining, using a deep learning module that is implemented by a processor configured to execute instructions stored in a non-transitory memory, image data from an image. The method also includes assigning, using the deep learning module, a set of default parameters to the image data, wherein the set of default parameters include values associated with at least one of a weather condition of the image and a defect condition of an object of the image. The method also includes generating, using the deep learning module, a set of predicted parameters based on the image data. The method also includes determining, using the deep learning module, an error for each parameter of the set of predicted parameters, wherein the error is based on a value of the parameter of the set of predicted parameters and a value of a corresponding default parameter of the set of default parameters. The method also includes adjusting, using the deep learning module and in response to the error for one parameter of the set of predicted parameters being greater than an error threshold, a weight of a corresponding connection of the deep learning module.

The present teachings also include a system for generating images of traffic objects using deep learning. The system includes a deep learning module that is implemented by a processor configured to execute instructions stored in a non-transitory memory. The instructions include obtaining, using the deep learning module, image data from an image. The instructions also include assigning, using the deep learning module, a set of default parameters to the image data, wherein the set of default parameters include values associated with at least one of a weather condition of the image and a defect condition of an object of the image. The instructions also include generating, using the deep learning module, a set of predicted parameters based on the image data. The instructions also include determining, using the deep learning module, an error for each parameter of the set of predicted parameters, wherein the error is based on a value of the parameter of the set of predicted parameters and a value of a corresponding default parameter of the set of default parameters. The instructions also include adjusting, using the deep learning module and in response to the error for one parameter of the set of predicted parameters being greater than an error threshold, a weight of a corresponding connection of the deep learning module.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a flowchart of an example control algorithm of the deep learning module according to the present disclosure.

Corresponding reference numerals indicate corresponding parts throughout the several views of the drawings.

DETAILED DESCRIPTION

Example embodiments will now be described more fully with reference to the accompanying drawings.

Figure 1A:
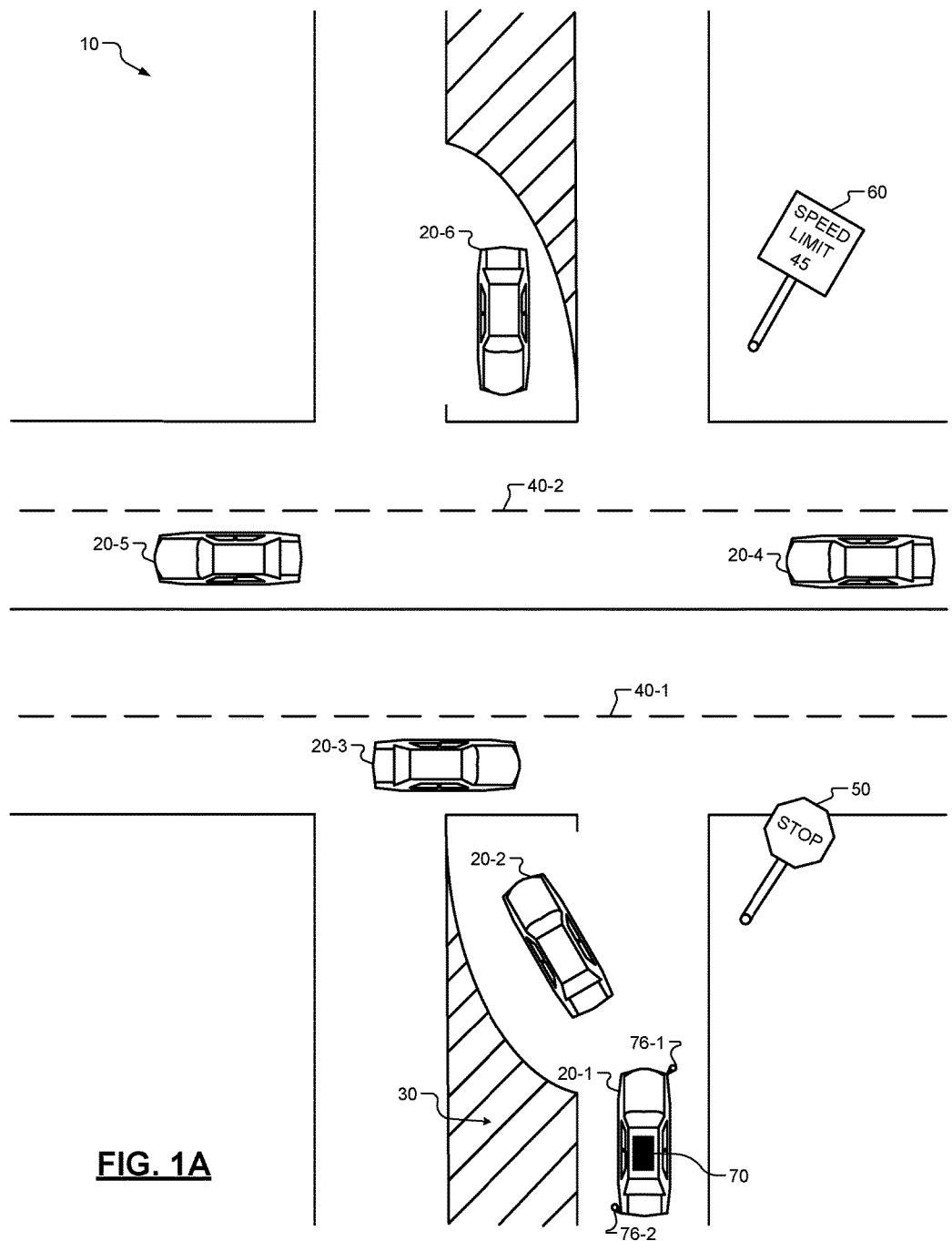
FIG. 1A is an example illustration of a roadway system according to the present disclosure.

With reference to FIG. 1A, an example illustration of a roadway system 10 is shown. The roadway system 10 may include vehicles 20-1, 20-2, 20-3, 20-4, 20-5, 20-6, a restricted zone 30, road-surface markings 40-1, 40-2 (collectively referred to as road-surface markings 40), a stop sign 50, and a speed limit sign 60. The vehicle 20-1 may also include an electronic control module 70 and cameras 76-1, 76-2 (collectively referred to as cameras 76).

The vehicle 20-1, using the cameras 76 and the electronic control module 70, may be configured to capture images of surrounding objects located on the roadway system 10 and determine what type of object is located in the image. As an example, the camera 76-1 may be configured to capture an image of the vehicles 20-2, 20-3, 20-4, 20-5, 20-6, the road-surface markings 40, the stop sign 50, and the speed limit sign 60. Furthermore, in response to receiving the images, the electronic control module 70 is configured to determine the object that is displayed in the image and/or any features associated with the object. The electronic control module 70 is described below in further detail with reference to FIG. 1B.

Figure 1B:
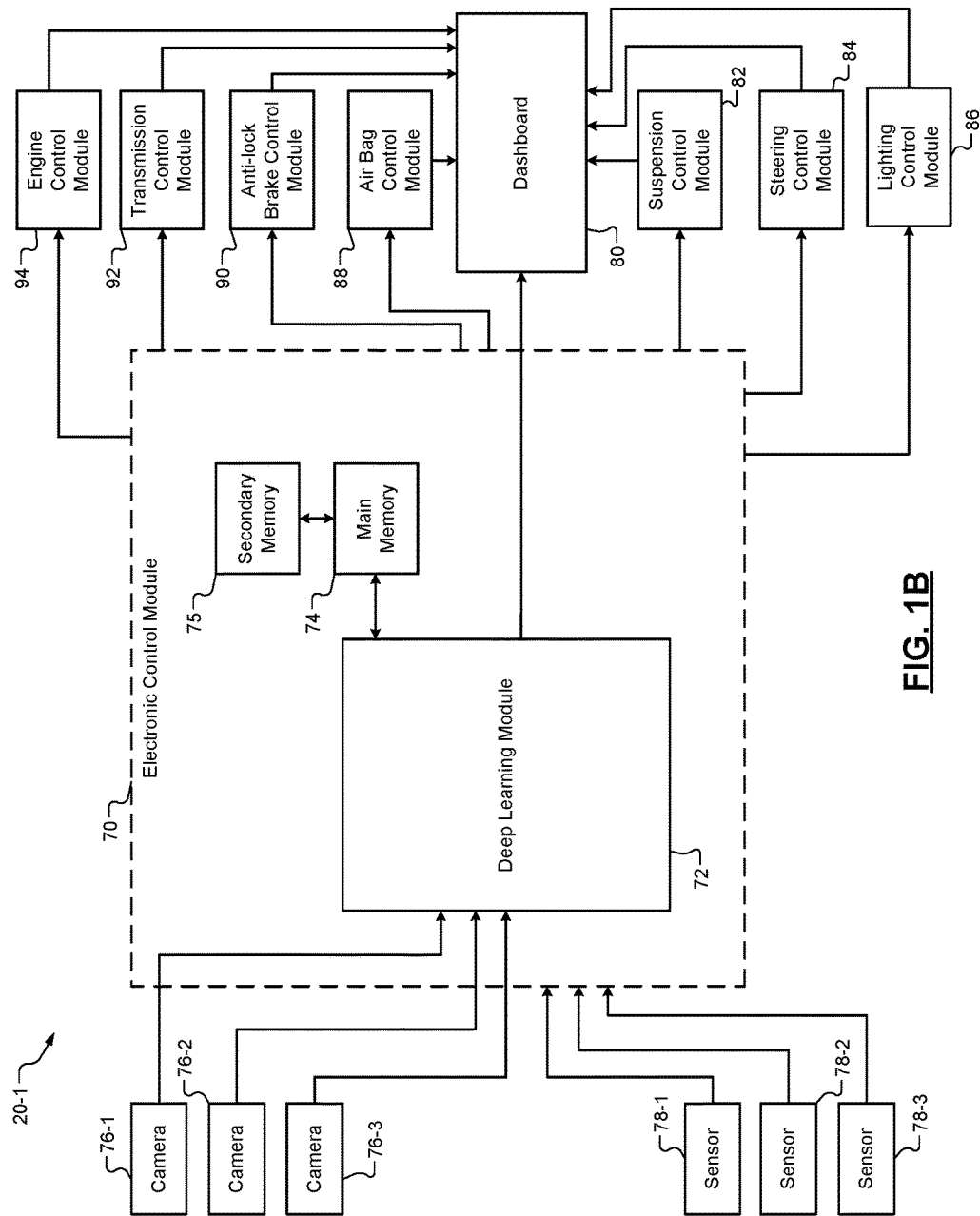
FIG. 1B is an example block diagram of a vehicle equipped with a deep learning module according to the present disclosure.

With reference to FIG. 1B, an example block diagram of the vehicle 20-1 equipped with the electronic control module 70 is shown. The vehicle 20-1 includes cameras 76-1, 76-2, 76-3 (collectively referred to as cameras 76), sensors 78-1, 78-2 (collectively referred to as sensors 78), a dashboard 80, a suspension control module 82, a steering control module 84, a lighting control module 86, an airbag control module 88, an anti-lock brake control module 90, a transmission control module 92, and an engine control module 94. The sensors 78 can include, for example, radar sensors, LIDAR sensors, additional image sensors, and other sensors configured to sense information about the surroundings of the vehicle, such as temperature sensors, ambient lighting sensors, etc.

The electronic control module 70 includes a deep learning module 72, a main memory 74, and a secondary memory 75. The deep learning module 72 may be implemented by a processor that is configured to execute instructions stored on the main memory 74 and/or the secondary memory 75. As an example, the deep learning module 72 may be a graphics processing unit (GPU). The main memory 74 and the secondary memory 75 may be non-transitory memory devices, such as read-only memory (ROM) and/or random-access memory (RAM). Furthermore, the main memory 74 and/or secondary memory 75 may be configured to store image data that is used to train the deep learning module 72, as described below with reference to FIGS. 2-3.

The deep learning module 72 is configured to receive images from the cameras 76. In response to receiving the images, the deep learning module 72 determines the object displayed in the image. As an example, in response to receiving an image of the stop sign 50, the deep learning module 72 is configured to determine that the image includes the stop sign 50 and/or any features associated with the stop sign 50. Additionally or alternatively, the deep learning module 72 is configured to generate an image based on other input parameters not generated by the cameras 76. The deep learning module 72 is described below in further detail with reference to FIGS. 2-3.

The electronic control module 70 may be in communication with the dashboard 80, the suspension control module 82, the steering control module 84, the lighting control module 86, the airbag control module 88, the anti-lock brake control module 90, the transmission control module 92, and the engine control module 94. The electronic control module 70 may be configured to transmit a signal to the control modules of the vehicle 20-1 with corrective instructions based on vehicle diagnostic information and environmental information obtained by the sensors 78 and in response to the deep learning module 72 identifying an object in an image. As an example, in response to the deep learning module 72 determining that the stop sign 50 is in the image captured by the cameras 76, and based on information corresponding to a speed of the vehicle 20-1 obtained by the sensors 78, the electronic control module 70 may communicate a signal to the engine control module 94 or the antilock brake control module 90 with instructions to slow down an engine of the vehicle 20-1 or to activate a braking system of the vehicle 20-1 to slow down the vehicle 20-1. As another example, in response to the deep learning module 72 determining that the road-surface marking 40-1 is in the image captured by the cameras 76, and based on steering wheel position information received by the sensors 78 that correspond to drifting, the electronic control module may communicate a signal to the steering control module 84 with instructions to adjust the position of the steering wheel.

Figure 2:
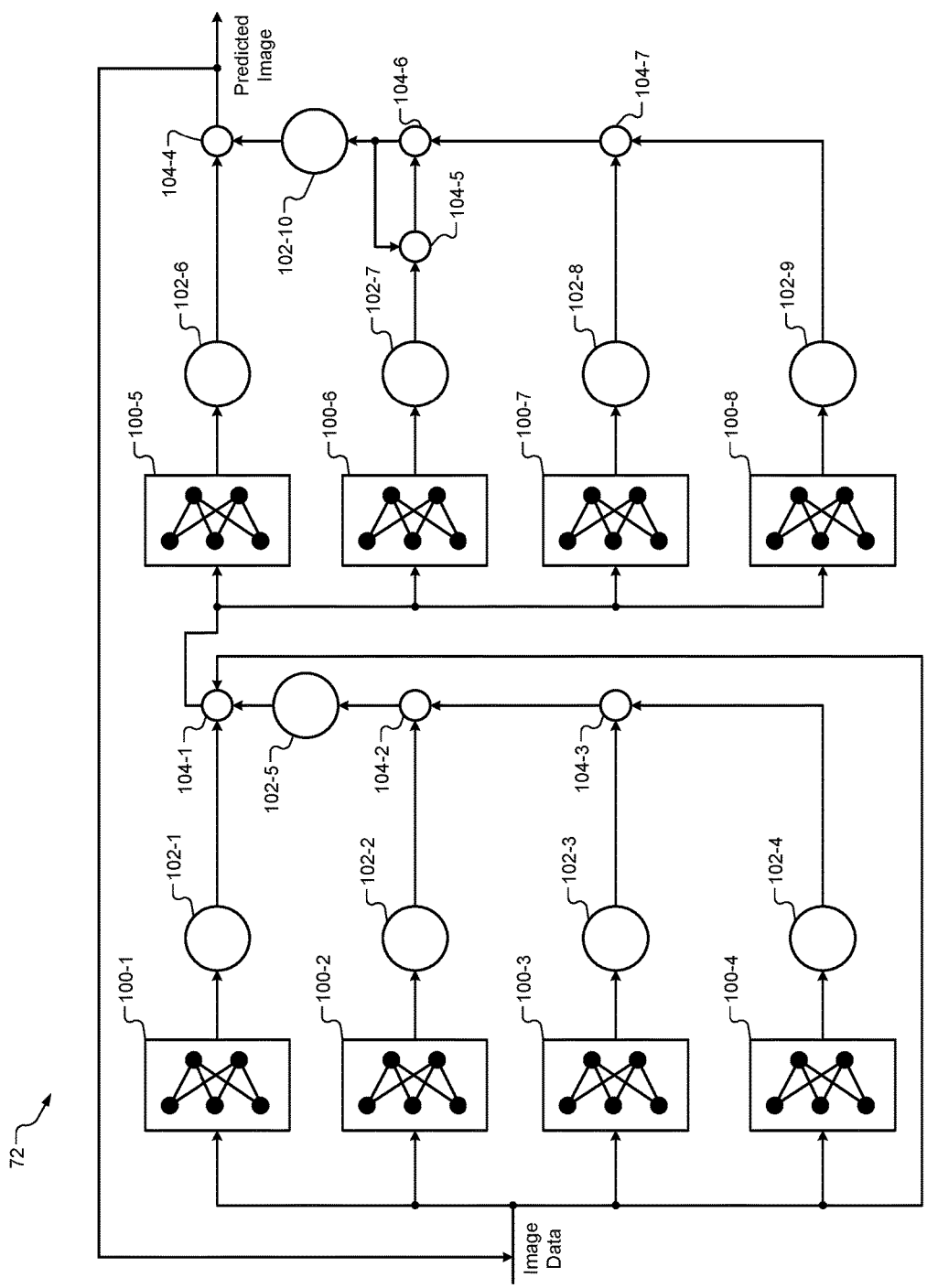
FIG. 2 is an example illustration of the deep learning module according to the present disclosure.

With reference to FIG. 2, an example illustration of the deep learning module 72 is shown. The deep learning module 72 may include deep learning networks 100-1, 100-2, 100-3, 100-4, 100-5, 100-6, 100-7, 100-8 (collectively referred to as deep learning networks 100), nonlinear processing elements 102-1, 102-2, 102-3, 102-4, 102-5, 102-6, 102-7, 102-8, 102-9, 102-10 (collectively referred to as nonlinear processing elements 102), and linear processing elements 104-1, 104-2, 104-3, 104-4, 104-5, 104-6, 104-7, (collectively referred to as linear processing elements 104). While FIG. 2 displays an example implementation of the deep learning module 72, any number and/or configuration of deep learning networks 100, nonlinear processing elements 102, and linear processing elements 104 may be used in alternative embodiments.

The deep learning networks 100 are configured to execute various machine learning algorithms using a plurality of cascaded layers that process the image data for feature extraction and transformation. Based on the multiple levels of processing performed by the successive layers, the deep learning network 100 is configured to generate high-level abstractions of image data. The deep learning networks 100 may be a deep neural network, a deep convolutional neural network, a deep belief network, a long short-term memory (LSTM) recurrent neural network, or other similar deep learning network.

Successive layers of the deep learning networks 100 may use the output from a previous layer as an input, and each of the layers of the deep learning networks 100 may be configured to perform nonlinear processing on the image data. The successive layers of the deep learning networks 100 may include a filtering layer that is configured to perform a convolution operation on the image (i.e., a convolutional layer); a pooling layer that is configured to determine a maximum value from a set of image data of the image data; a normalization layer that is configured to convert the value of each parameter to zero in response to the value of the parameter being less than zero; a logistic regression layer; and other similar nonlinear filtering layers.

The nonlinear processing elements 102, like the successive layers, may be configured to perform additional processing on the outputs of the deep learning networks 100 and/or the linear processing elements 104, such as an activation function, a sigmoid function, an inverse tangent function, and other similar functions. The linear processing elements 104 may be additional layers that are configured to perform additional processing on the outputs of the deep learning networks 100 and/or the nonlinear processing elements 102, such as a summing element and a multiplication element.

The deep learning module 72 may be trained in order to perform image detection and/or image generation. As an example, one may train the deep learning module 72 by performing supervised training on the deep learning module 72. Specifically, one may tag an image with a set of default parameters corresponding to edges, lines, position, orientation, scale, lighting conditions, defect conditions, and weather conditions of the image and/or objects of the image. The deep learning module 72 then processes the inputs to generate a set of test parameters. The set of test parameters may then be compared to the set of default parameters to generate an error. The error may then be propagated back through the various deep learning networks 100 of the deep learning module (i.e., backpropagation), thereby causing the deep learning module 72 to adjust the weights of the connections located within the deep learning networks 100 and/or between the deep learning networks 100, the nonlinear processing elements 102, and the linear processing elements 104. Once the error is below a predetermined threshold, the deep learning module 72 is trained. Additionally or alternatively, the deep learning module 72 may be trained using unsupervised training, wherein the deep learning module 72 processes an image and determines the set of parameters associated with the image and/or weight of the connections based on multiple iterations of test parameters generated for the image.

As described above, decreasing the error improves the accuracy of the deep learning module 72. Additionally, the accuracy of the deep learning module 72 may be improved by adjusting the weight of the connections and/or introducing noise during the training in order to avoid overfitting. As another example, as more images are inputted during the supervised and/or unsupervised training, the deep learning module 72 is configured to improve its accuracy with respect to object detection and image generation.

With reference to FIG. 3, a flowchart illustrating an example control algorithm 300 is shown. The control algorithm 300 starts at 304 when, for example, a user initializes the training of the deep learning module 72. At 308, the control algorithm 300 determines the range of values for each parameter of the deep learning module 72. As an example, if the deep learning module 72 is implemented by a graphics processing unit, the range of values may be a power of two, thereby permitting the graphics processing unit to partition matrices and/or connection weights for improved efficiency. The parameters, as described above, may correspond to edges, lines, position, orientation, scale, object type, lighting conditions, defect conditions, and weather conditions associated with the image and/or object of the image. As a more specific example, the range of the edges, lines, scale, and position may be 0-64, the range of the orientation may be 0-512, the range of the lighting conditions may be 0-128, and the range of the defect conditions and the weather conditions may be 0-32.

At 312, the control algorithm 300, using the deep learning module 72, obtains a first set of image data that has been tagged with a first set of default parameters. As an example, the first set of default parameters may include parameter values corresponding to a weather condition of sunny, a lighting condition of a slight glare, an orientation corresponding to facing the cameras 76, an object type of the stop sign 50, and a defect condition of slightly disfigured (e.g., a small crack on the surface of the stop sign 50). In alternate embodiments, the first set of default parameters may tag the first set of image data with a single parameter value for an identified parameter.

At 316, the control algorithm 300, using the deep learning module 72, process the set of image data using the deep learning networks 100, nonlinear processing elements 102, and/or linear processing elements 104 of the deep learning module 72. At 320, the control algorithm 300, using the deep learning module 72, generates predicted image parameters based on the processed image data. As an example, the predicted image parameters may be represented by a vector and/or matrix corresponding to the parameter range of the default parameters and based on the results of the image data being processed by the deep learning module 72.

At 324, the control algorithm 300, using the deep learning module 72, determines an error for each parameter of the predicted image parameters, which is based in part on the default parameters. At 328, the control algorithm 300 determines whether the error of each parameter is less than a corresponding threshold error. If so, the control algorithm 300 proceeds to 336; otherwise, the control algorithm 300 proceeds to 332. At 332, the control algorithm 300 adjusts the weight of a corresponding connection associated with the default parameter based on, for example, a gradient descent analysis. The gradient descent analysis includes, using the deep learning module 72, determining a gradient of the error of the corresponding parameter. Then, the deep learning module 72 minimizes an objective function that is parameterized by the deep learning module's parameters by updating the parameters in an opposite direction of the gradient of the objective function with respect to the parameter. A learning rate determines the size of the steps to reach a local minimum of the objective function. The control algorithm 300 then returns to 316.

At 336, the control algorithm 300 determines whether additional default parameters need to be tested. If additional default parameters need to be tested, the control algorithm 300 proceeds to 344; otherwise, the control algorithm 300 proceeds to 348. At 344, the control algorithm 300 obtains the next set of image data and tags the next set of image data with the next set of default parameters and returns to 316.

At 348, the control algorithm 300 determines whether the user desires to generate an image. If so, the control algorithm 300 proceeds to 352; otherwise, the control algorithm 300 proceeds to 356. At 352, the user inserts the desired parameters and generates an image based on the desired parameters. In other words, the user is able to generate any image based on any set of parameters once the deep learning module 72 is trained. The control algorithm 300 then proceeds to 372 and ends.

At 356, the control algorithm 300 determines whether the user desires to identify an object of an image. If so, the control algorithm 300 proceeds to 360; otherwise, the control algorithm 300 proceeds to 372 and ends. At 360, the control algorithm, using the deep learning module 72, obtains an image and extracts the corresponding image data of the object located therein. At 364, the control algorithm 300 processes the image data of the object using the deep learning module 72. At 368, the control algorithm 300 identifies the object and corresponding features of the object based on the processed image data of the object. The control algorithm 300 then ends at 372.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method comprising:
   obtaining, using a deep learning module that is implemented by a processor configured to execute instructions stored in a non-transitory memory, image data from an image;
   assigning, using the deep learning module, a set of default parameters to the image data, wherein the set of default parameters include values associated with at least one of a weather condition of the image and a defect condition of an object of the image;
   generating, using the deep learning module, a set of predicted parameters based on the image data;

determining, using the deep learning module, an error for each parameter of the set of predicted parameters, wherein the error is based on a value of the parameter of the set of predicted parameters and a value of a corresponding default parameter of the set of default parameters; and adjusting, using the deep learning module and in response to the error for one parameter of the set of predicted parameters being greater than an error threshold, a weight of a corresponding connection of the deep learning module.

2. The method of claim 1 further comprising generating, using the deep learning module, an image based on a set of test parameters.

3. The method of claim 1 further comprising identifying, using the deep learning module and in response to receiving a first image, the object of the image based on a set of object parameters associated with the first image.

4. The method of claim 3, wherein identifying the object is based on a comparison of the set of object parameters to the set of default parameters.

5. The method of claim 1, wherein the set of default parameters include parameters associated with an edge of the object, a line of the object, a position of the object, an orientation of the object, a scale of the object, an object type of the object, and a lighting condition of the image.

6. The method of claim 1, wherein generating the set of predicted parameters based on the image data includes filtering, using a filtering module that is configured to perform a convolution operation, the image data.

7. The method of claim 1, wherein generating the set of predicted parameters based on the image data includes determining, using a pooling module of the deep learning module, a maximum value from a set of the image data.

8. The method of claim 1, wherein generating the set of predicted parameters based on the image data includes converting the value of the parameter of the set of predicted parameters to zero in response to the value of the parameter of the set of predicted parameters being less than zero.

9. A system comprising:
a deep learning module that is implemented by a processor configured to execute instructions stored in a non-transitory memory, wherein the instructions include:
obtaining, using the deep learning module, image data from an image;
assigning, using the deep learning module, a set of default parameters to the image data, wherein the set of default parameters include values associated with at least one of a weather condition of the image and a defect condition of an object of the image;
generating, using the deep learning module, a set of predicted parameters based on the image data;
determining, using the deep learning module, an error for each parameter of the set of predicted parameters, wherein the error is based on a value of the parameter of the set of predicted parameters and a value of a corresponding default parameter of the set of default parameters; and
adjusting, using the deep learning module and in response to the error for one parameter of the set of predicted parameters being greater than an error threshold, a weight of a corresponding connection of the deep learning module.

10. The system of claim 9 wherein the instructions include generating, using the deep learning module, an image based on a set of test parameters.

11. The system of claim 9 wherein the instructions include identifying, using the deep learning module and in response to receiving a first image, the object of the image based on a set of object parameters associated with the first image.

12. The system of claim 11, wherein identifying the object is based on a comparison of the set of object parameters to the set of default parameters.

13. The system of claim 9, wherein the set of default parameters include parameters associated with an edge of the object, a line of the object, a position of the object, an orientation of the object, a scale of the object, an object type of the object, and a lighting condition of the image.

14. The system of claim 9, wherein generating the set of predicted parameters based on the image data includes filtering, using a filtering module that is configured to perform a convolution operation, the image data.

15. The system of claim 9, wherein generating the set of predicted parameters based on the image data includes determining, using a pooling module of the deep learning module, a maximum value from a set of the image data.

16. The system of claim 9, wherein the set of predicted parameters based on the image data includes converting the value of the parameter of the set of predicted parameters to zero in response to the value of the parameter of the set of predicted parameters being less than zero.

* * * * *